(12) United States Patent
Trisnadi et al.

(10) Patent No.: US 6,876,475 B1
(45) Date of Patent: Apr. 5, 2005

(54) DUAL MODULATOR WAVELENGTH-SELECTIVE SWITCH AND EQUALIZER

(75) Inventors: Jahja I. Trisnadi, Cupertino, CA (US); Clinton B. Carlisle, Palo Alto, CA (US); Robert W. Corrigan, Sisters, OR (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 23 days.

(21) Appl. No.: 10/346,757

(22) Filed: Jan. 17, 2003

(51) Int. Cl.$^7$ ................................................. G02F 1/00
(52) U.S. Cl. ........................................ 359/237; 385/16
(58) Field of Search ................................ 359/237, 223, 359/224, 290, 291, 559, 562; 385/16, 17, 18, 19

(56) References Cited

U.S. PATENT DOCUMENTS

| | | | |
|---|---|---|---|
| 5,627,678 A | * 5/1997 | Nishii et al. ................. 359/561 |
| 6,005,992 A | 12/1999 | Augustsson et al. | |
| 6,169,624 B1 | 1/2001 | Godil et al. | |
| 6,268,952 B1 | 7/2001 | Godil et al. | |
| 6,285,500 B1 | 9/2001 | Ranalli et al. | |
| 6,345,136 B1 | 2/2002 | Augustsson | |
| 6,374,019 B1 | 4/2002 | Gustavsson | |
| 6,643,069 B2 | * 11/2003 | Dewald ....................... 359/629 |
| 6,665,463 B2 | * 12/2003 | Baron et al. .................. 385/18 |

OTHER PUBLICATIONS

Corrigan, Robert, et al. "Silicon Light Machines—Grating Light Valve Technology Brief", Jun. 2001, pp. 1–8, Silicon Light Machines, Sunnyvale, California.

Allan, Roger, "Highly Accurate Dynamic Gain Equalizer Controls Optical Power Precisely", Electronic Design, Feb. 4, 2002, pp. 37–40.

* cited by examiner

*Primary Examiner*—Hung Xuan Dang
*Assistant Examiner*—Tuyen Tra
(74) *Attorney, Agent, or Firm*—Okamoto & Benedicto LLP (57) ABSTRACT

One embodiment pertains to an apparatus for wavelength-selective switching and equalization of an incoming multiplexed signal having a plurality of wavelength components. The apparatus includes a first controllable light modulator, a second controllable light modulator, and a lens system. The first controllable light modulator controllably deflects a first set of the wavelength components and controllably reflects a second set of the wavelength components. The wavelength components in the second set are mapped onto separate sections of the second controllable light modulator by the lens system and are controllably reflected by the second controllable light modulator.

17 Claims, 12 Drawing Sheets

Fig. 1: Functional diagram of the 1×2 WSSE.

Channels 1,4 to EXPRESS, ch 2,3 to DROP

EXPRESS

DROP

DUAL MODULATOR WAVELENGTH-SELECTIVE SWITCH AND EQUALIZER

RELATED APPLICATIONS

The present application is related to U.S. patent application Ser. No. 10/315,792, entitled "Wavelength-Selective Switch and Equalizer," filed Dec. 10, 2002, by inventors Jahja I. Trisnadi and Clinton B. Carlisle. The present application is also related to U.S. provisional application No. 60/434,024, entitled "Optical Device with Polarization Diversity Module," filed Dec. 17, 2002, by inventors Clinton B. Carlisle, Jahja I. Trisnadi, Edward D. Huber, and Robert L. MacDonald.

BACKGROUND OF THE INVENTION

1. Field of the Invention

The present invention relates generally to devices for telecommunications. More particularly, the invention relates to devices for wavelength division multiplexed networks.

2. Description of the Background Art

To further increase the capacity on existing optical networks a number of techniques are known. One technique is to use a type of wavelength division multiplexing (WDM) in order to improve the utilization of the available bandwidth.

One problem to overcome in WDM networks relates to managing the frequently changing network operation. Reconfigurable systems are needed in this regard.

A different problem in WDM networks pertains to non-uniform gains that are wavelength dependent. For example, erbium doped fiber amplifiers (EDFA) exhibit a non-uniform gain spectrum that differs depending on the WDM channel. It is desirable to be able to equalize such non-uniform gain between channels.

SUMMARY

One embodiment of the invention relates to a method for wavelength-selective switching and equalization of an incoming multiplexed signal. The method includes at least dispersing a plurality of wavelength components of the incoming multiplexed signal onto separate sections of a first controllable light modulator. A first set of the wavelength components is controllably deflected and a second set of the wavelength components is controllably reflected using the first controllable light modulator. The wavelength components in the second set are then mapped onto separate sections of a second controllable light modulator.

Another embodiment of the invention pertains to an apparatus for wavelength selective switching and equalization of an incoming multiplexed signal having a plurality of wavelength components. The apparatus includes at least a first controllable light modulator, a second controllable light modulator, and a lens system for mapping selected wavelength components from the first controllable light modulator to the second controllable light modulator.

These and other features of the present invention will be readily apparent to persons of ordinary skill in the art upon reading the entirety of this disclosure, which includes the accompanying drawings and claims.

BRIEF DESCRIPTION OF THE DRAWINGS

The use of the same reference label in different drawings indicates the same or like components. Drawings are not to scale unless otherwise noted.

DETAILED DESCRIPTION

As discussed above, reconfigurable systems are needed to manage the continuously changing network operation in modern WDM networks. The reconfigurable systems may utilize controllable switching devices to re-route the optical traffic. One example of such a device is a 1×2 wavelength-selective switch (WSS). The 1×2 WSS is used to divide an incoming WDM line into two WDM lines with complementary spectral components.

Another separate device is a dynamic channel equalizer. The equalizer may be used, for example, to ensure the power balance of all the WDM lines.

In this specification, the multiplexed signals are referred to generically as "WDM" signals. We intend "WDM" to be inclusive of WDM, DWDM, and other granularities of wavelength division multiplexed signals.

Figure 1:
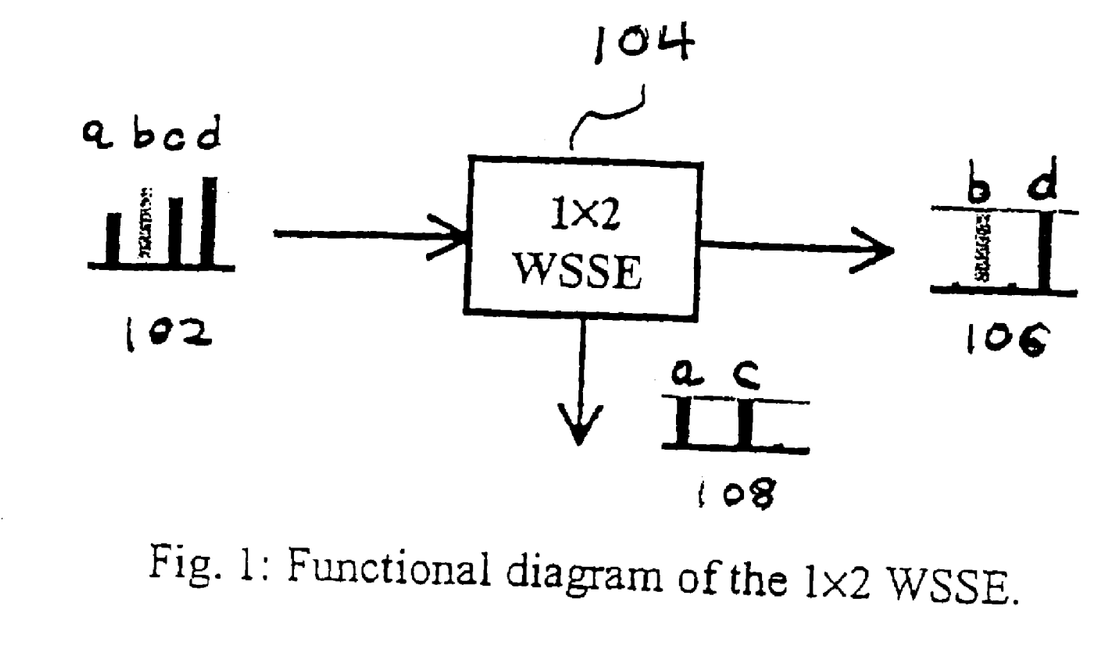
FIG. 1 is a functional diagram of a 1×2 wavelength-selective switch and equalizer (WSSE) in accordance with an embodiment of the invention.

FIG. 1 is a functional diagram of a 1×2 wavelength-selective switch and equalizer (WSSE) in accordance with an embodiment of the invention. Such a WSSE device advantageously combines the prior separate functionalities of a WSS device and two dynamic channel equalizer devices. The functional diagram depicts, as an example, an input 102 with four wavelength components (a, b, c and d). The input is received by the 1×2 WSSE 104. The "1×2" indicates that there is one input WDM signal and two output WDM signals. The WSSE 104 has two outputs 106 and 108.

In this instance, the first output 106 is shown to include the second and fourth wavelength components (b and d), while the second output 108 is shown to include the first and third wavelength components (a and c). In other words, the WSSE 104 selected the first wavelength component (a) to be switched to the second output 108, the second wavelength component (b) to be switched to the first output 106, the third wavelength component (c) to be switched to the second output 108, and the fourth wavelength component (d) to be switched to the first output 106.

Furthermore, the wavelength components are shown to have been equalized by the WSSE 104. In this instance, the second and fourth components (b and d) have been equalized to a first magnitude, and the first and third components (a and c) have been equalized to a second magnitude that is in general different than the first. This equalization is also advantageously performed by the WSSE device 104 in accordance with an embodiment of the invention.

As mentioned above, the functionality of the WSSE device 104 may be implemented using three separate conventional boxes, one 1×2 switch and two dynamic channel equalizers. However, doing so involves extra cost, complexity and packaging. Further, such a conventional implementation using separate boxes may have problems relating to insertion loss and polarization dependent loss. The present invention involves a means for combining these functions in a single package with a compact, low-cost optical design.

Figure 2:
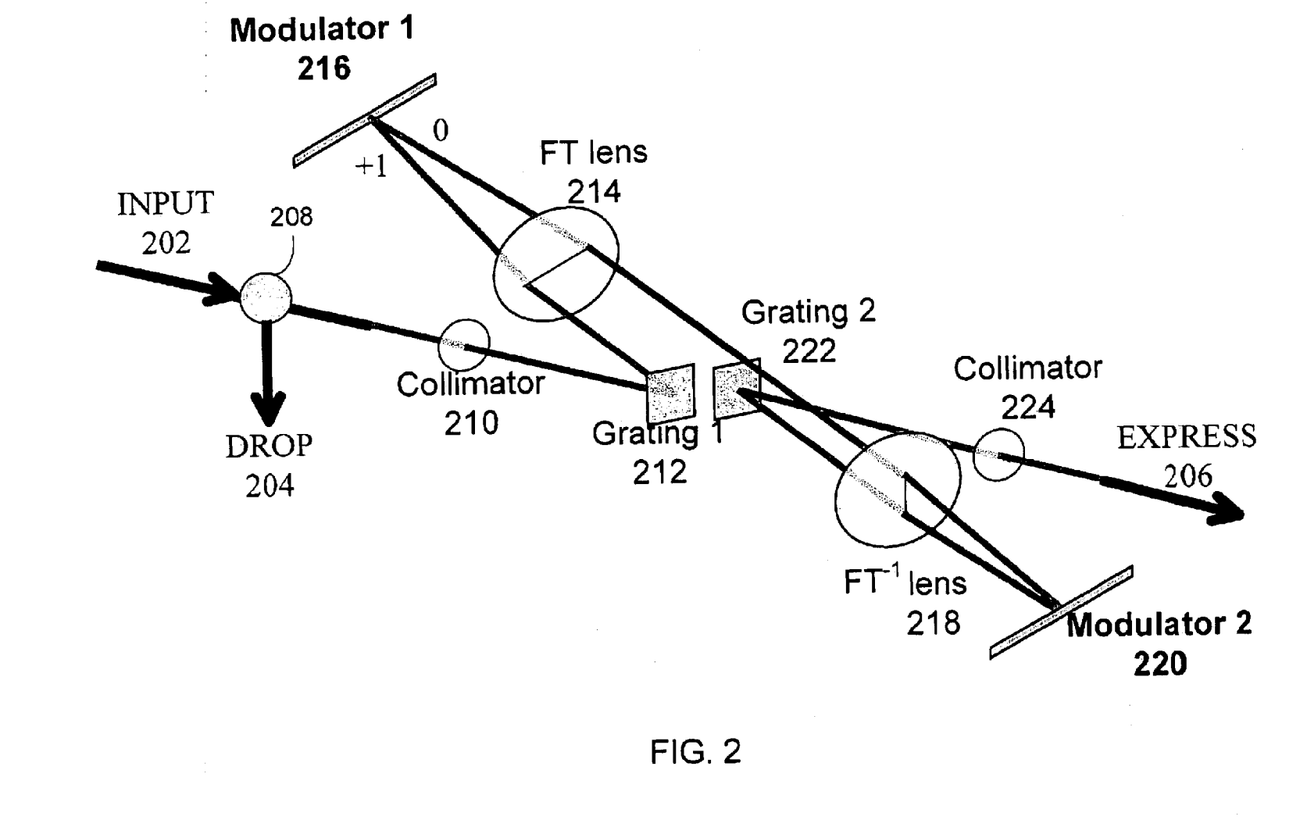
FIG. 2 is a schematic diagram of a first apparatus for wavelength-selective switching and equalization in accordance with an embodiment of the invention.

FIG. 2 is a schematic diagram of a first apparatus for wavelength-selective switching and equalization in accordance with an embodiment of the invention. Specifically, FIG. 2 depicts a 1×2 WSSE with one wavelength-multiplexed input signal 202 and two wavelength-multiplexed output signals (204 and 206).

In a preferred embodiment described in detail below, the first output signal 204 includes wavelength components to be "dropped" and so is labeled as a drop signal, and the second output signal 206 includes wavelength components to be "expressed" or transmitted onward and so is labeled as an express signal. Alternatively, the first output signal 204 may include wavelength components to be expressed, and the second output signal 206 may include wavelength components to be dropped. As another alternative, neither of the two output signals may be dropped, and instead both may be expressed. In other words, the scope of the invention should cover any utilization of the two output signals from the WSSE. The use of the terms "expressed" and "dropped" as used herein are for descriptive purposes only. It should be clear to one-skilled in the arts that uses other than expressing for onward transmission or dropping for local utilization are also enabled by the method and apparatus described herein.

While the overall design of the invented WSSE may be implemented using various types of linear light modulators, the preferred embodiment described in detail below is implemented using GRATING LIGHT VALVE (GLV) type devices. Publications describing GLV devices include, among others: "The Grating Light Valve: Revolutionizing Display Technology," by D. M. Bloom, Projection Displays III Symposium, SPIE Proceedings, Volume 3013, San-Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; "Breakthrough MEMS Component Technology for Optical Networks," Robert Corrigan, Randy Cook, and Olivier Favotte, Silicon Light Machines—Grating Light Valve Technology Brief, 2001; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

The input signal 202 may be received by an optical circulator 208. The circulator 208 may send the input signal to a first collimator 210 that launches the input signal to a first optical grating 212.

The first grating 212 disperses the plurality of wavelength components (also called channels) of the incoming multiplexed signal. Each channel is diffracted at a different angle because of its different wavelength. A Fourier transform (FT) lens 214 used in an f—f configuration maps and focuses the plurality of wavelength components onto separate sections of a first controllable light modulator 216. A controllable light modulator as discussed herein may comprise, for example, an array of GRATING LIGHT VALVE (GLV) type devices. GLV type devices and their operation in accordance with an embodiment of the invention are described below in relation to FIGS. 7 and 8. Other types of linear light modulators, such as those using angularly controllable mirrors, may be utilized in other implementations of the invention.

The first controllable light modulator 216 controllably deflects the wavelength components (channels) to be dropped. The channels to be dropped may be deflected back along the path labeled "+1," (for the first-order diffraction) and back through the FT lens 214 onto the first grating 212. This deflection may be accomplished, for example, by configuring the pertinent sections of the first controllable modulator 216 as described below in relation to FIG. 8. In this instance, the pertinent sections are those that receive the optical signals of the channels to be dropped.

The first grating 212 retro-diffracts the channels to be dropped to form a re-multiplexed signal to be dropped at the first collimator 210. The re-multiplexed signal to be dropped travels back through the first collimator 210 to the circulator 208. The circulator 208 sends the re-multiplexed signal to be dropped to the drop line 204.

The first controllable light modulator 216 also controllably reflects the wavelength components (channels) to be expressed. The channels to be expressed may be reflected along the path labeled "0" (for zero-order diffraction). The reflection may be accomplished, for example, by configuring the pertinent sections of the first controllable modulator 216 as described below in relation to FIG. 7. In this instance, the pertinent sections are those that receive the optical signals of the channels to be expressed.

The channels to be expressed then may be mapped onto separate sections of a second controllable light modulator 220. The mapping may be performed by transmitting the channels to be expressed through a lens system. The lens system may comprise, for example, the FT lens 214 and an inverse or conjugate FT lens 218 (which is denoted $FT^1$). The FT and $FT^1$ lenses may be configured such that the channels to be expressed are mapped with unity magnification from the first controllable light modulator 216 to the second controllable light modulator 220.

The second controllable light modulator 220 controllably reflects the wavelength components (channels) to be expressed. The second controllable light modulator 220 may also comprise, for example, an array of GLV type devices. The channels to be expressed may be reflected to a second grating 222. The reflection may be accomplished, for example, by configuring the pertinent sections of the second controllable light modulator 220 as described below in relation to FIG. 7. In this instance, the pertinent sections are those that receive the optical signals of the channels to be expressed.

The second grating 222 may be configured to diffract the channels to be expressed such that a re-multiplexed signal to be expressed is formed at a second collimator 224. The re-multiplexed signal to be expressed travels through the second collimator 224 to the express line 206.

Equalization or attenuation of the channels to be dropped (also called the drop channels) may be advantageously performed by controlling the first controllable modulator 216. By varying the magnitude or strength of the first order diffraction for each wavelength component to be dropped, the drop channels may be controllably attenuated.

Equalization or attenuation of the channels to be expressed (also called the express channels) may be advantageously performed by controlling the second controllable-modulator 220. By varying the magnitude or strength of the reflection (zero-order diffraction) for each wavelength component to be expressed, the express channels may be controllably attenuated.

In addition, the second controllable modulator 220 may be used to suppress any remaining power in the drop channels that is transmitted along with the express channels. This may be accomplished by minimizing the magnitude or strength of the reflection of each of the drop channels by the second controllable modulator 220.

Figure 7:
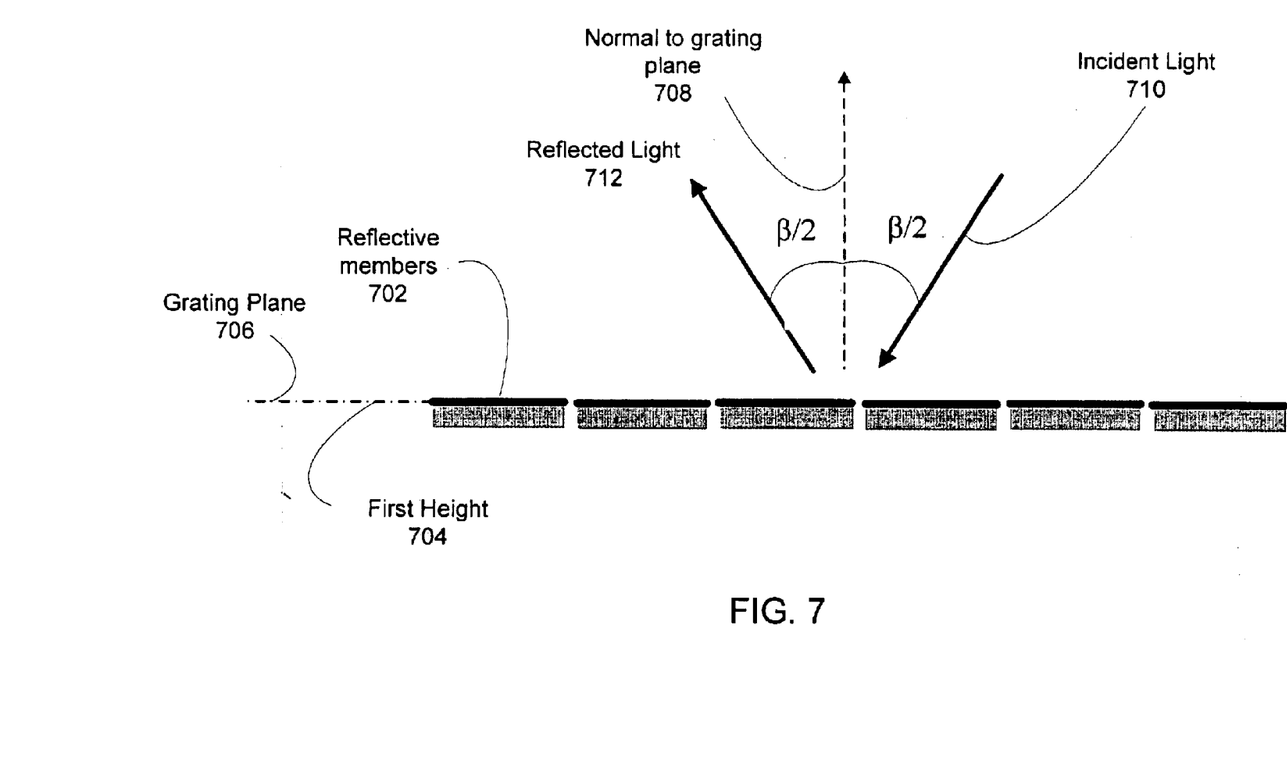
FIG. 7 is a schematic depiction of a GLV-type device in a reflective mode or configuration in accordance with an embodiment of the invention.
Figure 8:
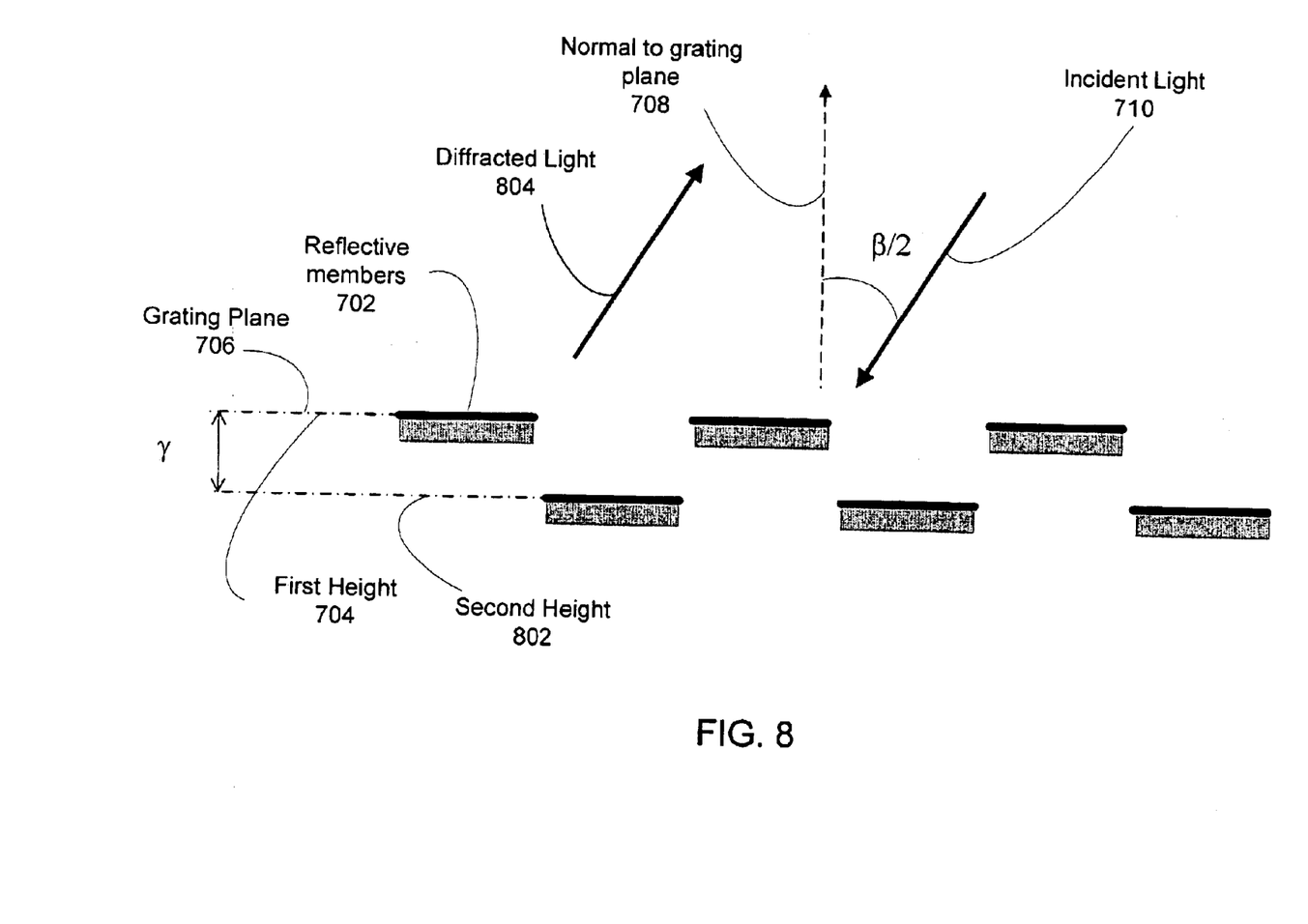
FIG. 8 is a schematic depiction of a GLV-type device in a diffractive mode or configuration in accordance with an embodiment of the invention.

Controllable variation of the reflections and of the first order diffraction may be performed as described below in relation to FIGS. 7 and 8. FIG. 7 shows a GLV-type device in a reflective mode, while FIG. 8 shows a GLV-type device in a diffractive mode. By varying the height differential $\gamma$ shown in FIG. 8, the strength of the reflection may be increased while the strength of the diffraction is decreased, or vice-versa. For example, by setting $\gamma$ to zero, the strength of the reflection may be maximized while the strength of the diffraction is minimized.

Figure 3:
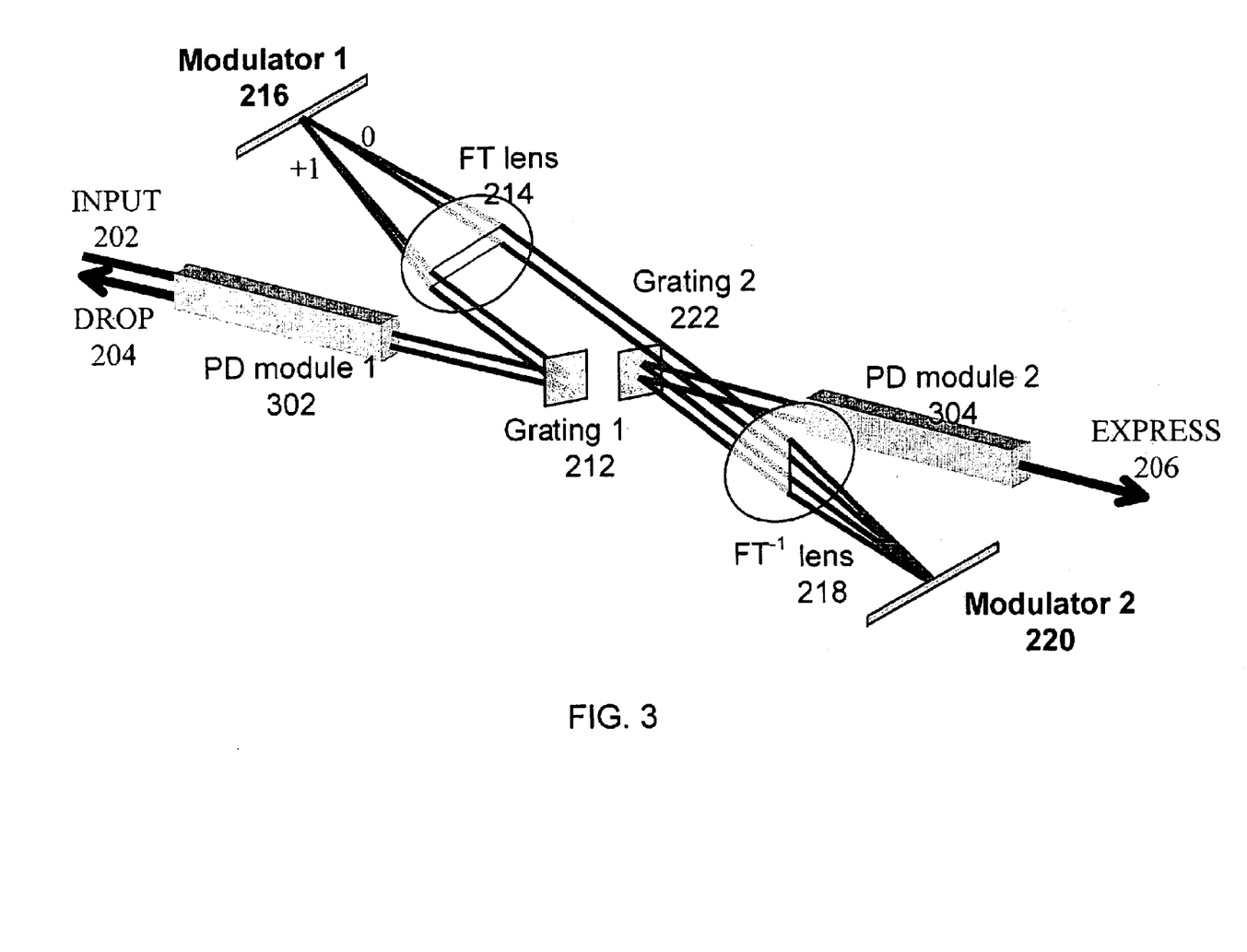
FIG. 3 is a schematic diagram of a second apparatus for wavelength-selective switching and equalization in accordance with an embodiment of the invention.

FIG. 3 is a schematic diagram of a second apparatus for wavelength-selective switching and equalization in accordance with an embodiment of the invention. The apparatus of FIG. 3 is similar to that of FIG. 2 with the addition of two polarization diversity (PD) modules (302 and 304). The apparatus advantageously uses the PD modules for polarization dependent loss (PDL) suppression.

The incoming multiplexed signal 202 enters the first PD module 302. The first PD module 302 collimates the input signal 202 and splits the input signal into two parallel beams with a predetermined polarization. The two parallel beams are launched into free-space towards the first grating 212. The two parallel beams (and their component channels) are then processed by the subsequent devices (including the first grating 212, the FT lens 214, the first controllable light modulator 216, the $FT^1$ lens 218, the second controllable light modulator 220, and the second grating 222) in a same or analogous way as the one beam (and its component channels) is processed. For example, the first optical grating 212 disperses wavelength components from each of the two beams, and the FT lens 214 maps and focuses the wavelength components onto separate sections of the first controllable light modulator 216.

However, instead of one beam of drop channels being formed by retro-diffraction by the first grating 212, two beams of drop channels are so formed (both with the predetermined polarization). These two beams re-enter the first PD module 302 and are combined therein into a single beam with the same polarization as that of the input signal 202.

Similarly, instead of one beam of express channels being formed by diffraction by the second grating 222, two beams of express channels are so formed (both with the predetermined polarization). These two beams re-enter the second PD module 304 and are combined therein into a single beam with the same polarization as that of the input signal 202.

The construction and operation of the PD modules are described in further detail below in relation to FIGS. 5 and 6. In addition, note that the function of the circulator 208 is integrated into the first PD module 302 in the embodiment depicted in FIG. 3.

Advantageously, the beam-system interaction occurs at a fixed polarization in the apparatus of FIG. 3. By configuring the two beam paths to be equivalent in that they have the same insertion loss, then the polarization dependent loss (PDL) of the apparatus should vanish or be minimal.

A prototype of the apparatus of FIG. 3 (with polarization diversity modules) was built and tested. Selective switching with blocking extinction of greater than or equal to 40 decibels (dB) was successfully demonstrated. The measured insertion loss was about 6 dB for the express channels and about 8 dB or less for the drop channels. The measured PDL was less than about 0.25 dB.

FIGS. 4A through 4F depict experimental results showing the successful wavelength-selective switching and equalization functionalities achieved with the prototype apparatus. The graphs show the signal strength versus wavelength for the express and drop signals.

Figure 4A:
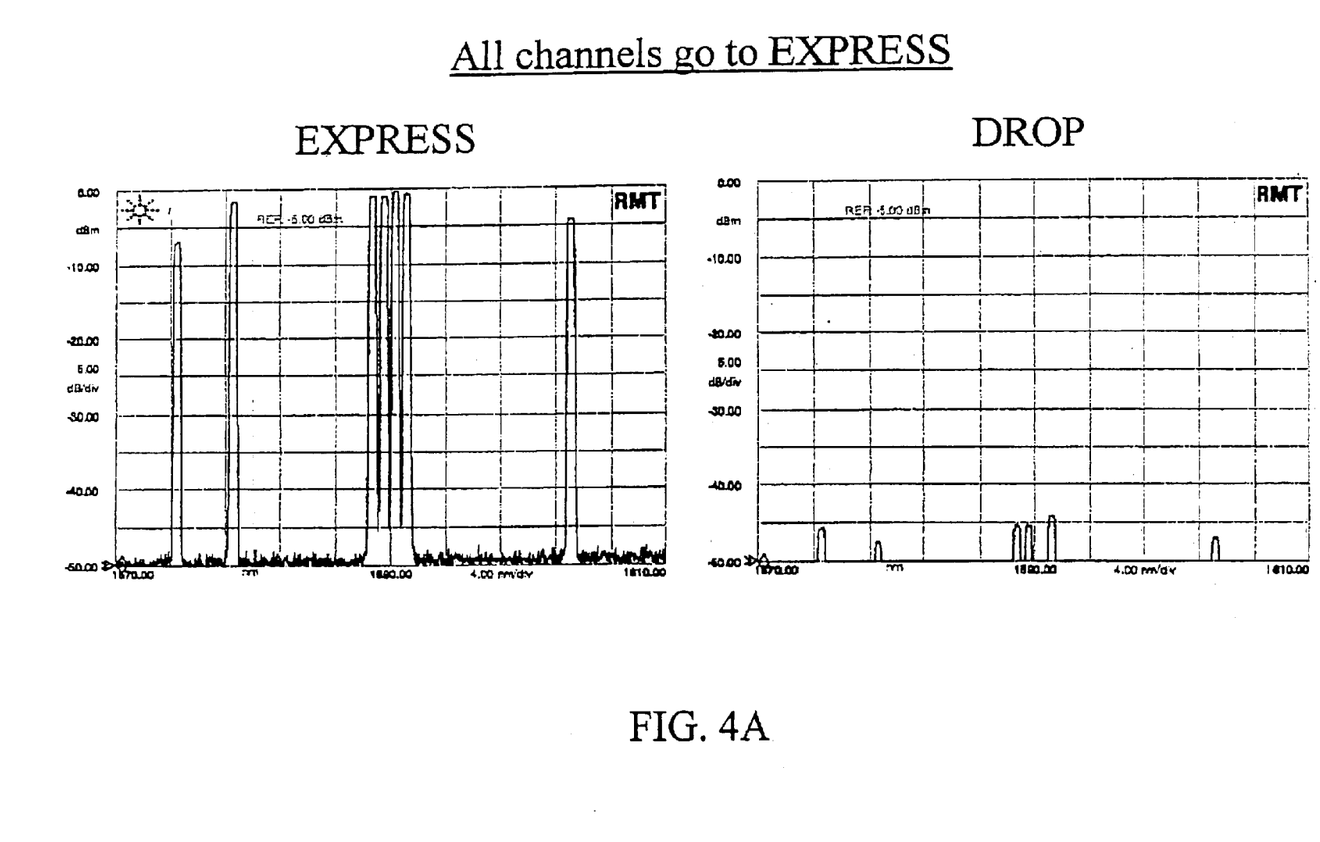
FIGS. 4A through 4F depict experimental results showing the successful wavelength-selective switching and equalization functionalities achieved using a method and apparatus in accordance with an embodiment of the invention.
Figure 4B:
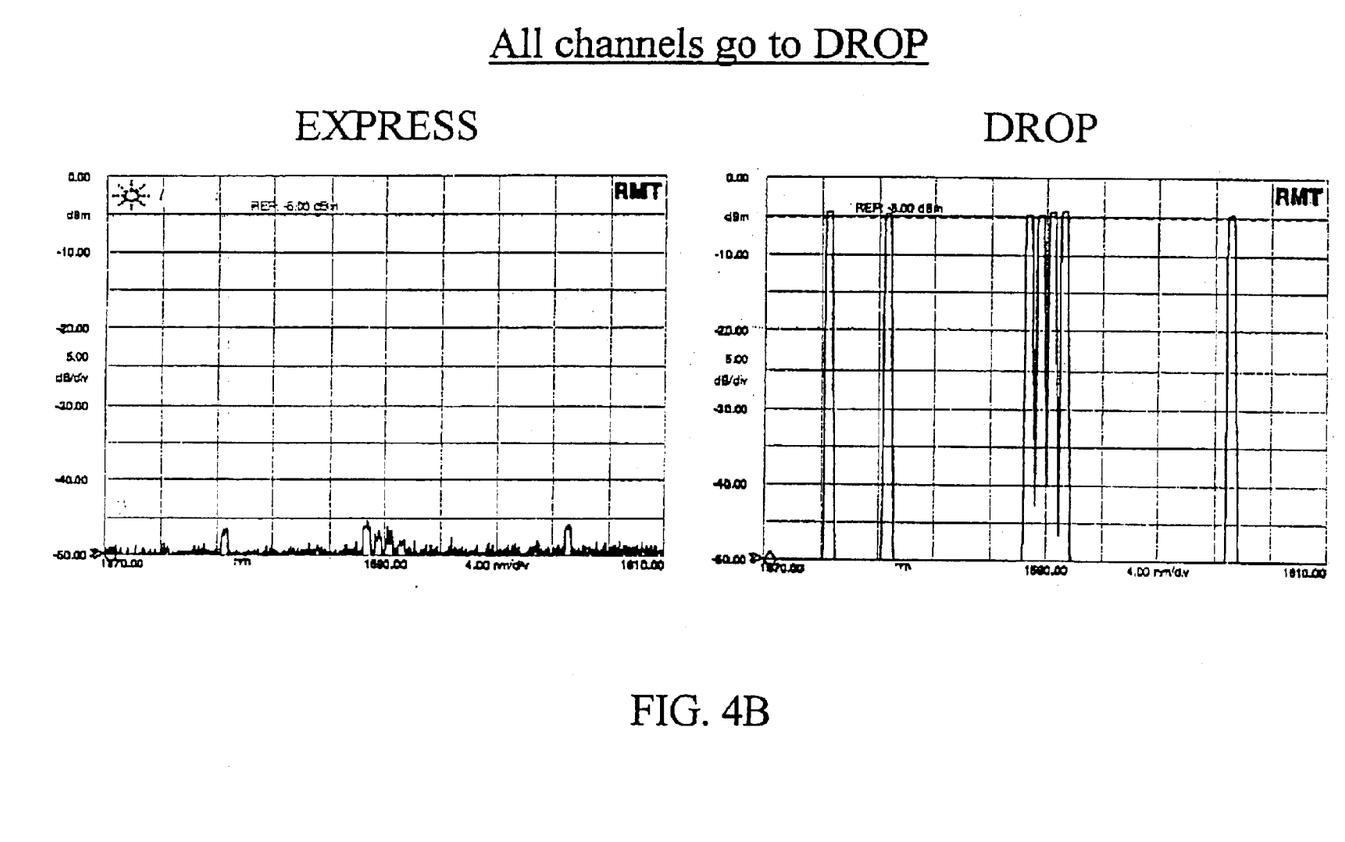
Figure 4C:
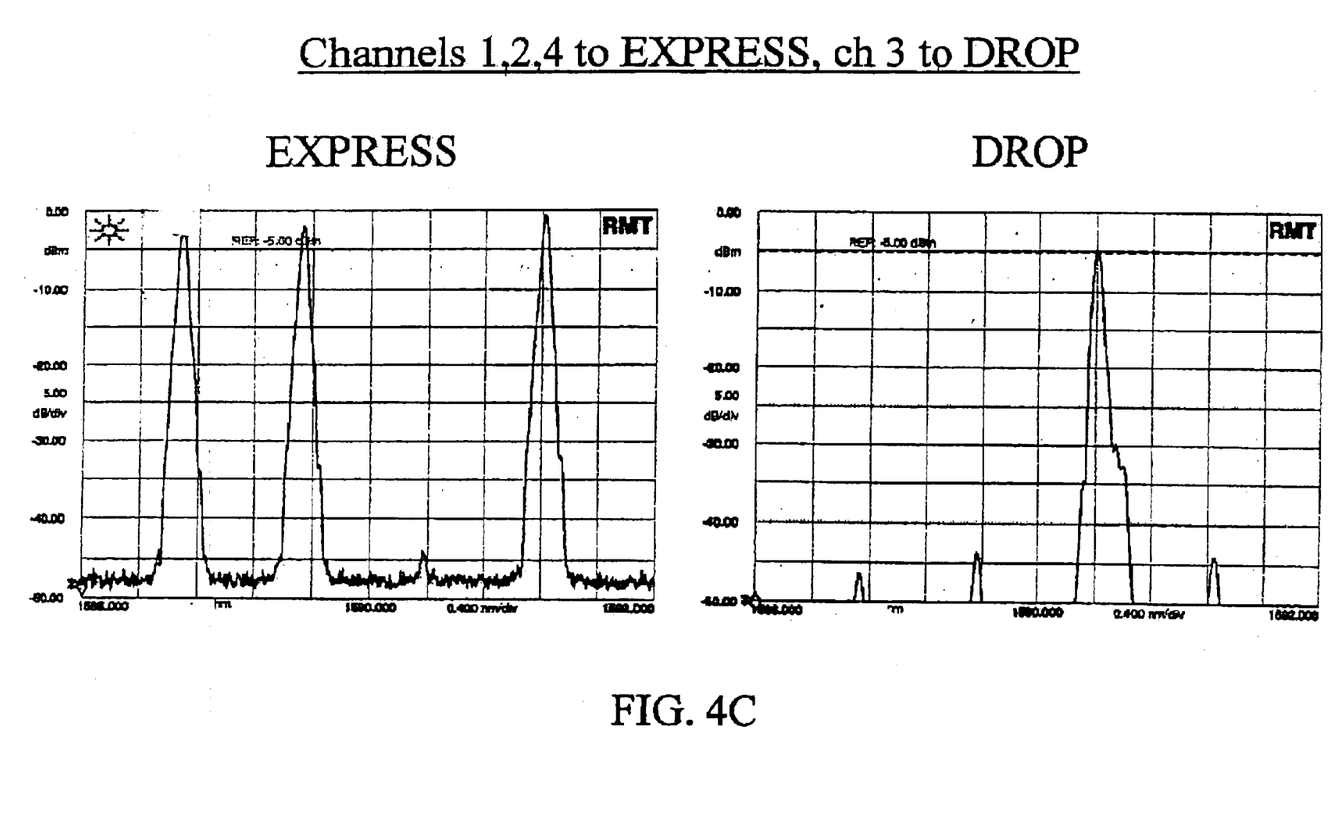

In FIGS. 4A and 4B, the multiplexed input signal is shown to include seven wavelength components (channels) in a wavelength range between about 1574 nanometers (nm) to about 1603 nm. The graphs in FIG. 4A show the results when the WSSE is set such that each of the seven channels is switched to express. The channel amplitudes in the drop signal are shown to be about 40 dB lower than the channel amplitudes in the express signal. The graphs in FIG. 4B show the results when the WSSE is set such that each of the seven channels is switched to drop. The channel amplitudes in the express signal are shown to be about 40 dB lower than the channel amplitudes in the drop signal.

In FIGS. 4C, 4D, 4E and 4F, the four channels grouped around 1590 nm in wavelength are shown. With regard to FIG. 4C, there is shown the results when the WSSE is set such that channels 1, 2, and 4 are switched to express while channel 3 is switched to drop. The signal amplitudes of channels 1, 2, and 4 in the drop signal are shown to be about 40 dB lower than the signal amplitudes of channels 1, 2, and 4 in the express signal. Meanwhile, the signal amplitude of channel 3 in the express signal is shown to be about 40 dB lower than the signal amplitude of channel 3 in the drop signal.

Figure 4D:
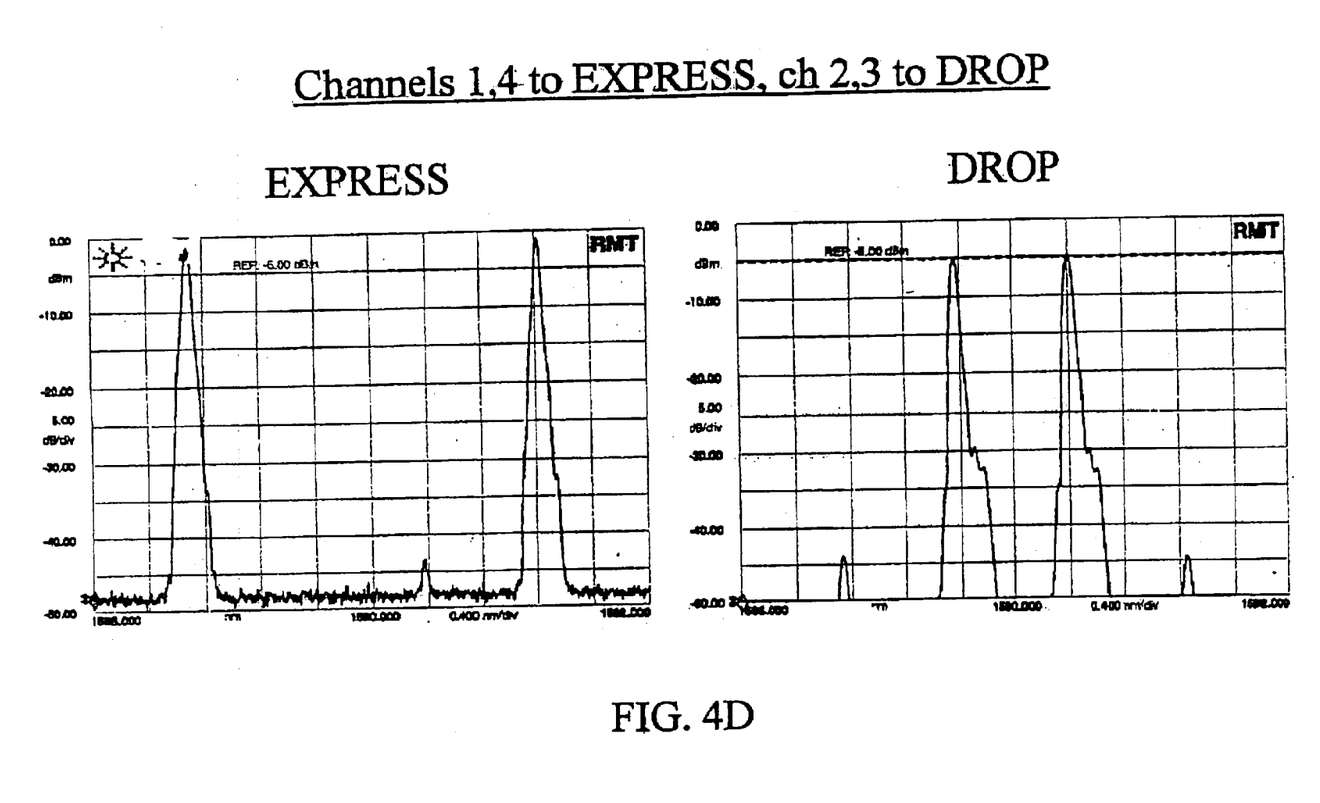

With regard to FIG. 4D, there is shown the results when the WSSE is set such that channels 1 and 4 are switched to express while channels 2 and 3 are switched to drop. The signal amplitudes of channels 1 and 4 in the drop signal are shown to be about 40 dB lower than the signal amplitudes of channels 1 and 4 in the express signal. Meanwhile, the signal amplitudes of channels 2 and 3 in the express signal are shown to be about 40 dB lower than the signal amplitudes of channels 2 and 3 in the drop signal.

Figure 4E:
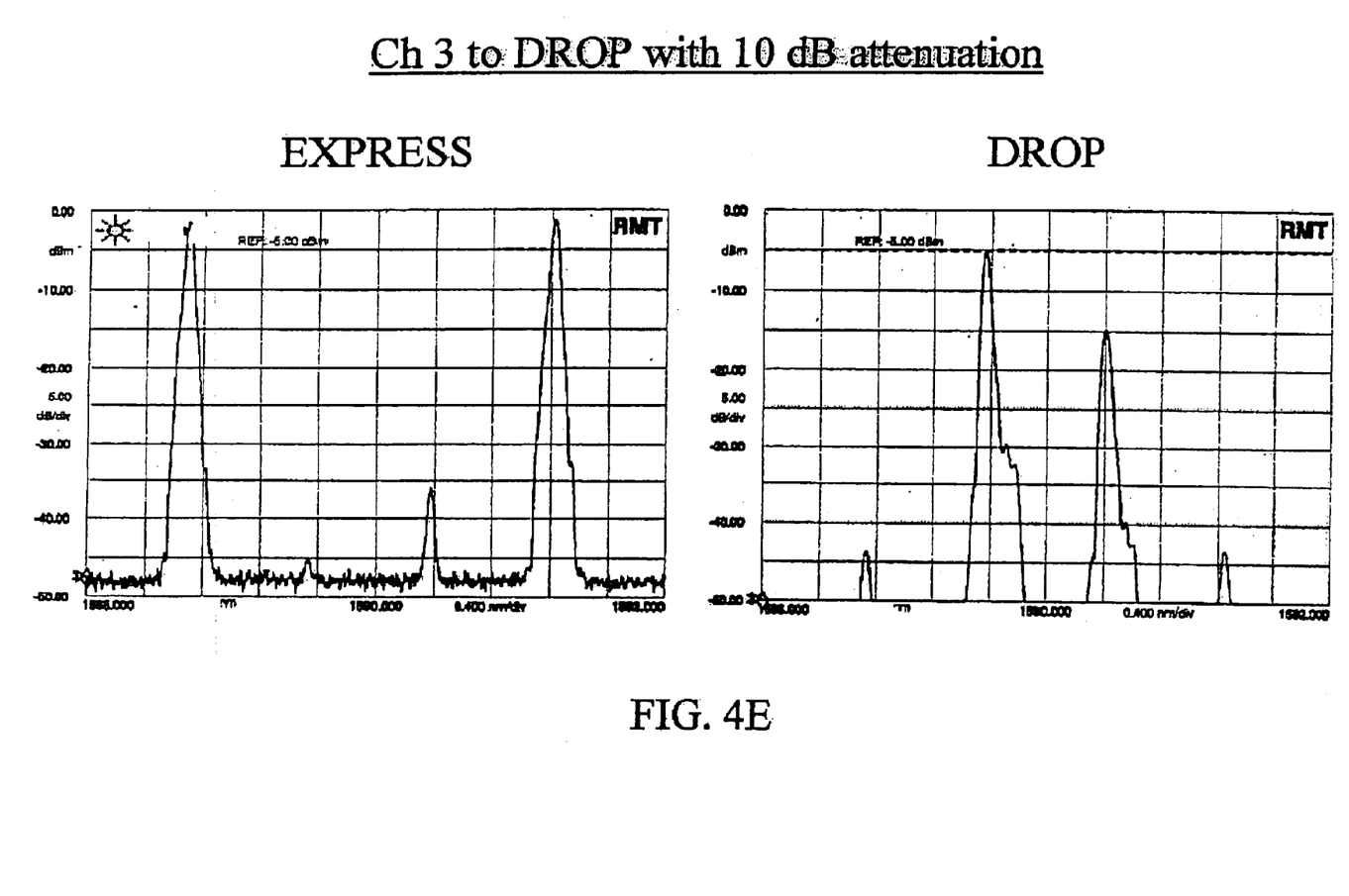

With regard to FIG. 4E, the situation in FIG. 4E is similar to that of FIG. 4D, except that an attenuation of 10 dB is applied to channel 3 by the WSSE apparatus. This illustrates the functionality of the equalization feature of the WSSE. Again, there is shown the results when the WSSE is set such that channels 1 and 4 are switched to express while channels 2 and 3 are switched to drop. However, in this instance, the 10 dB attenuation applied by the WSSE to channel 3 is shown as reducing the channel 3 amplitude in the drop signal by about 10 dB.

Figure 4F:
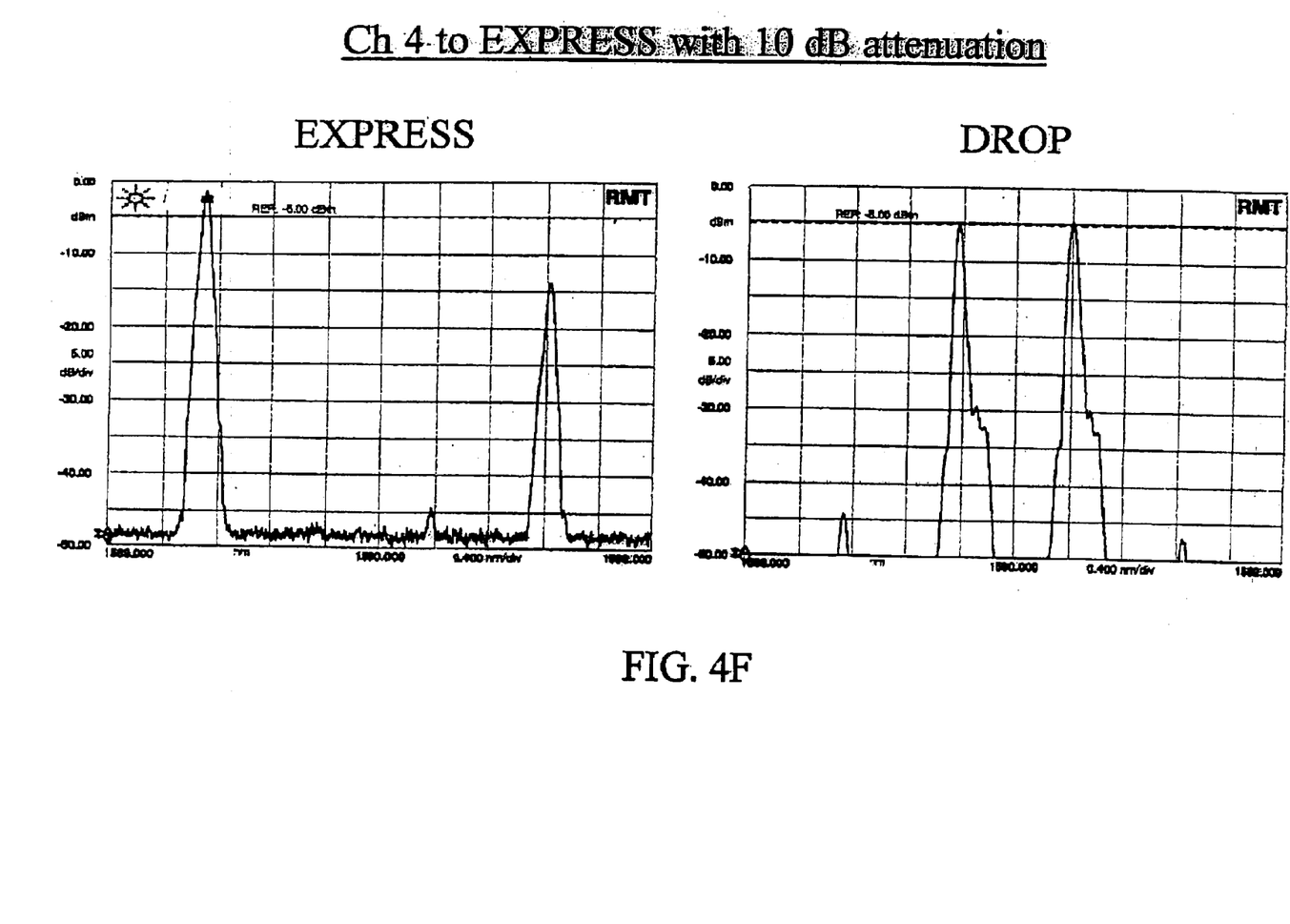

With regard to FIG. 4F, the example in FIG. 4F is again similar to that of FIG. 4D. In this instance, an attenuation of 10 dB is applied to channel 4 by the WSSE. This again illustrates the equalization functionality by showing that each individual channel may be attenuated by a controlled amount using the WSSE. The 10 dB attenuation applied by the WSSE to channel 4 is shown in FIG. 4F as reducing the channel 4 amplitude in the express signal by about 10 dB.

Figure 5:
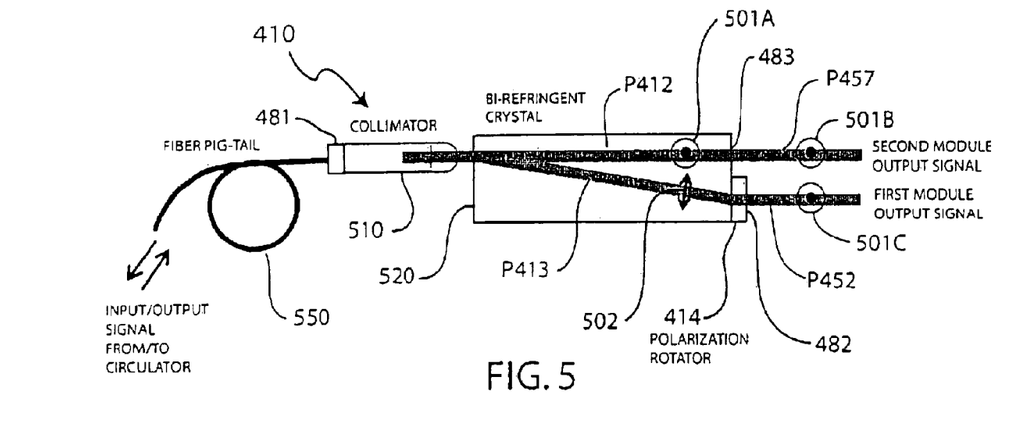
FIG. 5 schematically shows a polarization diversity module.

Referring now to FIG. 5, there is schematically shown a polarization diversity module 410 in accordance with an embodiment of the present invention. As shown in FIG. 5, diversity module 410 may comprise a collimator 510, a bi-refringent crystal 520, and a polarization rotator 414. Optical signals may go in and out of diversity module 410 via a pig-tail 550 of a fiber-optic cable, which in turn may be coupled to a circulator (not shown). Note that depending on the application, a circulator may also be integrated in diversity module 410.

An optical input signal may enter collimator 510 via pig-tail 550. Similarly, an optical output signal from collimator 510 may enter pig-tail 550 and propagate out to the rest of the system. Collimator 510 may be a collimating lens configured to direct an input/signal into bi-refringent crystal 520, and to direct an output signal from bi-refringent crystal 520 into pig-tail 550.

In one embodiment, bi-refringent crystal 520 is configured to decompose an input signal from collimator 510 into two orthogonally polarized and spatially separated signals, namely a P-polarized signal on an optical path P412 and an S-polarized signal on an optical path P413. Bi-refringent crystal 520 may be an yttrium vanadate ($YVO_4$) crystal, for example. Note that in FIG. 5, symbols 501 (i.e., 501A, 501B, 501C) represent a P-polarized signal, while symbol 502 represents an S-polarized signal. Also note that in the present disclosure, a P-polarized signal and an S-polarized signal are identified with respect to the plane of incidence at the grating 212 (or 222). In particular, a P-polarized signal is in parallel with the plane of incidence, whereas an S-polarized signal is perpendicular to the plane of incidence. The plane of incidence is formed by light beams impinging on, and light beams diffracted from, a grating 212 (or 222).

A bi-refringent crystal, in general, is a doubly refracting material. That is, a bi-refringent crystal has two indices of refraction. Light entering a bi-refringent crystal along a direction not parallel to the optical axis of the crystal will be divided into two orthogonal beams propagating in different directions. Embodiments of the present invention take advantage of this property to spatially separate an optical input signal into its two polarization state components.

Still referring to FIG. 5, polarization rotator 414 may be coupled to bi-refringent crystal 520 to convert the S-polarized signal on path P413 to a P-polarized signal on path P452. This allows the first module output signal on path P452 to have the same polarization state as the second module output signal on path P457. In this example, both the first and second module output signals are P-polarized. Both of the module output signals may also be S-polarized by placing polarization rotator 414 in path P457 instead of in path P452. Polarization rotator 414 may be a half-wave plate, for example. A half-wave plate, in general, is an optical component that can be adjusted to rotate a polarization angle by 90 degrees. Thus, a half-wave plate converts an S-polarized signal to a P-polarized signal or vice versa.

From paths P452 and P457, the first and the second module output signals, respectively, propagate as the polarization diversified input signals that are adapted to be directed to the grating 212.

It is to be noted that a P-polarized input signal going into port 481 will come out of port 483 as a P-polarized second module output signal, while an S-polarized input signal going into port 481 will come out of port 482 as a P-polarized first module output signal. An arbitrarily polarized input signal going into port 481 will be split into two spatially separated beams that are both P-polarized as discussed above. P-polarized signals coming back to bi-refringent crystal 520 through port 482, port 483, or both are re-combined as an output signal on port 481 and propagate back to the rest of the system. Preferably, to minimize variations in the output signal coming out of port 481, the first and second module output signals are optically processed in substantially identical fashion in the WSSE.

As can be appreciated from the foregoing, the first and second module output signals of diversity module 410 will have the same polarization state regardless of the polarization state of an input signal entering the diversity module. Advantageously, this ensures that light beams propagating in the WSSE will have the same polarization state, thereby mitigating the effects of polarization dependent loss.

The optical components of diversity module 410, such as collimator 510, bi-refringent crystal 520, and polarization rotator 414 are preferably, but not necessarily, micro-optical components. Micro-optical components are substantially smaller than regular size optical components, and are thus advantageously more compact. Micro-optical components are commercially available from various manufacturers including Koncent Communications, Inc. of China. Micro-optical implementation is based on very mature technology and has been proven to meet the very stringent requirements of the optical communication industries (such as Telcordia standards). For example, a polarization diversity module 410 with micro-optical components may be fabricated in accordance with an embodiment of the present invention to conform to the following specifications:

a) operable in telecommunication wavelengths of 1525 nm to 1570 nm (C-band);
b) a first module output signal and a second module output signal with optics axes that are parallel to each other;
c) a first module output signal and a second module output signal having a beam diameter of 1.6 mm (e $^2$);
d) a first module output signal and a second module output signal having a beam center-to-center separation of 2.5 mm; and
e) a first module output signal and a second module output signal that are both P-polarized.

Figure 6:
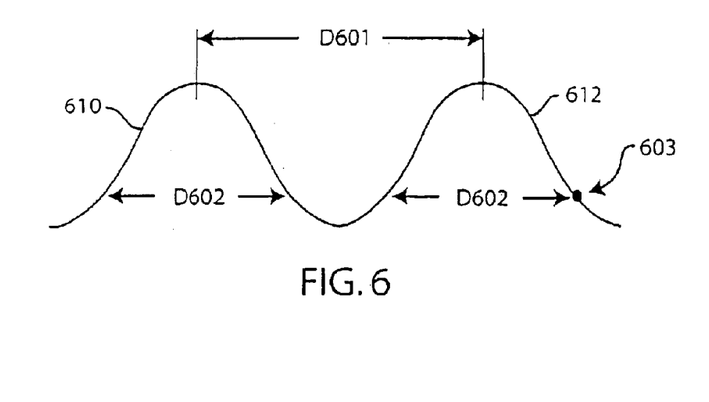
FIG. 6 schematically shows output signals of a polarization diversity module.

FIG. 6 schematically shows a first module output signal intensity profile 610 and a second module output signal intensity profile 612 in accordance with an embodiment of the present invention. First module output signal 610 may be an output of diversity module 410 coming out of port 482, while second module output signal 612 may be an output of diversity module 410 coming out of port 483. In FIG. 6, a dimension D601 represents the separation between the beams of signals 610 and 612. As mentioned, dimension D601 may be 2.5 mm. A dimension D602 represents beam diameter as measured at a point 603, which may be a point where the amplitude of the beam is 13.5% of peak amplitude. As mentioned, dimension D602 may be 1.6 mm.

FIG. 7 is a schematic depiction of a GLV-type device in a reflective mode or configuration in accordance with an embodiment of the invention. As described above, a controllable light modulator comprising an array of such devices may be advantageously utilized to create a 1×2 WSSE. The GLV-type device includes a group of 2N reflective elements or ribbons 702. In the example shown, N=3, such that there are three pairs of reflective elements 702.

In the reflective configuration, the reflective elements 702 are configured to be at a same first height 704 above a base electrode and parallel to the grating plane 706. With such a configuration, incident light 710 the impinges upon the device at an angle β/2 (with respect to the normal 708 to the grating plane) is reflected as shown in FIG. 7 at an equal (and opposite) angle with respect to the normal 708.

FIG. 8 is a schematic depiction of a GLV-type device in a diffractive mode or configuration in accordance with an embodiment of the invention. In the diffractive configuration, the reflective members 702 are configured or movably positioned such that the elements are at two different heights (704 and 802) as shown in FIG. 8. In particular, every other element 702 may be positioned at a second height 802 that is lower by a distance γ than the first height.

In one particular embodiment, the incident light 710 impinges at an angle ~β/2 such that the diffracted light 804 corresponds to a first-order diffraction from the grating of the GLV-type device. On the other hand, the reflected light 712 corresponds to a zero-order diffraction (i.e. a reflection) from the device. The amount of diffracted light 804 versus the amount of reflected light 712 in FIG. 7 depends on the vertical distance γ between the two levels (704 and 802) of reflective members 702. The vertical distance γ of each GLV-type device may be modulated to control the attenuation of the channel corresponding to that device. Maximum diffraction is obtained if the vertical deflection γ=λ/4, where λ is the light wavelength.

In principle, both controllable light modulators can employ either zero-order or first-order diffractions. With the conventional (square grating) GLV-type devices, the trade-offs are insertion loss and modulation contrast. The first-order diffraction of the conventional GLV-type device has a relatively high insertion loss. This is because only one of the two first-order diffractions can be collected practically. A coherent combiner may potentially be used to overcome this, but use of such a coherent combiner may add other complications. However, the first-order diffraction has relatively better contrast, and makes it easy to maintain a consistently high extinction. The operational choice depends on the performance specification required for the particular application.

The embodiments described above in relation to FIGS. 2 and 3 provides a relatively low insertion loss on the express line with reasonably good extinction (because the express signal passes two controllable light modulators such that the second controllable modulator may be used to improve the extinction) and provides a higher (but normally acceptable) insertion loss on the drop line with a good and stable extinction on the drop line.

In order to achieve a low insertion loss and high, stable extinction for both the express and drop signals, a blazed GRATING LIGHT VALVE (GLV) device may be used for the first and second controllable light modulators. An apparatus using one or more blazed GLV type devices is an alternative embodiment of the invention.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for wavelength-selective switching and equalization of an incoming multiplexed signal the method comprising:

dispersing a plurality of wavelength components of the incoming multiplexed signal onto separate sections of a first controllable light modulator;

controllably deflecting a first set of the wavelength components and controllably reflecting a second set of the wavelength components using the first controllable light modulator;

mapping the wavelength components in the second set onto separate sections of a second controllable light modulator;

equalizing the wavelength components in the first set by using the first controllable light modulator to control a first order diffraction magnitude for each of the wavelength components in the first set;

suppressing the wavelength components in the first set by using the second controllable light modulator; and equalizing the wavelength components in the second set by using the second controllable light modulator to control a zero order diffraction magnitude for each of the wavelength components in the second set.

2. The method of claim 1, wherein the wavelength components in the first set correspond to channels to be dropped, wherein the wavelength components in the second set correspond to channels to be expressed, and wherein insertion loss of the channels to be expressed is less than the insertion loss of the channels to be dropped.

3. A The method of claim 1, further comprising:

dispersing the incoming multiplexed signal into the plurality of wavelength components using a first diffraction grating; and retro-diffracting the wavelength components in the first set using the first diffraction grating to form a re-multiplexed signal.

4. The method of claim 3, further comprising:

receiving the incoming multiplexed signal by way of a circulator; and sending the re-multiplexed signal to an output line by way of the circulator.

5. The method of claim 3, further comprising:

receiving the incoming multiplexed signal through a polarization diversity module; and sending the re-multiplexed signal through the polarization diversity module.

6. The method of claim 1, further comprising:

controllably reflecting the wavelength components in the second set using the second controllable light modulator; and diffracting the wavelength components in the second set using a second diffraction grating to form a re-multiplexed signal.

7. The method of claim 6, further comprising:

sending the re-multiplexed signal through a polarization diversity module.

8. An apparatus for wavelength-selective switching and equalization of an incoming multiplexed signal having a plurality of wavelength components, the apparatus comprising:

a first controllable light modulator for controllably deflecting a first set of the wavelength components and controllably reflecting a second set of the wavelength components;

a second controllable light modulator for controllably reflecting the wavelength components in the second set; and a lens system for mapping the wavelength components in the second set onto separate sections of the second controllable light modulator, wherein the first controllable light modulator equalizes the wavelength components in the first set by controlling a first order diffraction magnitude for each of the wavelength components in the first set, and wherein the second controllable light modulator equalizes the wavelength components in the second set and suppresses the wavelength components in the first set by controlling a zero order diffraction magnitude for each of said wavelength components.

9. The apparatus of 8, wherein the wavelength components in the first set correspond to channels to be dropped, wherein the wavelength components in the second set correspond to channels to be expressed, and wherein insertion loss of the channels to be expressed is less than the insertion loss of the channels to be dropped.

10. The apparatus of claim 8, further comprising:

a first diffraction grating for dispersing the incoming multiplexed signal into the plurality of wavelength components; and a fourier transform lens for focusing the plurality of wavelength components onto separate sections of the first controllable light modulator.

11. The apparatus of claim 10, wherein the lens system comprises the fourier transform lens and an inverse fourier transform lens, and wherein the lens system maps the wavelength components in the second set with unit magnification.

12. The apparatus of claim 10, wherein the wavelength components in the first set are retro-diffracted using the first diffraction grating to form a re-multiplexed signal.

13. The apparatus of claim 12, further comprising:

a circulator for receiving the incoming multiplexed signal and for sending the re-multiplexed signal to an output line.

14. The apparatus of claim 12, further comprising:

a polarization diversity module through which is transmitted the incoming multiplexed signal and the re-multiplexed signal.

15. The apparatus of claim 10, further comprising:

a second diffraction grating for diffracting the wavelength components in the second set so as to form a re-multiplexed signal.

16. The apparatus of claim 15, further comprising:

a polarization diversity module through which is transmitted the re-multiplexed signal.

17. An apparatus for wavelength-selective switching and equalization of an incoming multiplexed signal, the apparatus comprising:

a first controllable means for controllably deflecting a first set of the wavelength components and controllably reflecting a second set of the wavelength components;

a second controllable means for controllably reflecting the wavelength components in the second set; and means for mapping the wavelength components in the second set onto separate sections of the second controllable means, wherein the first controllable means equalizes the wavelength components in the first set by controlling a first order diffraction magnitude for each of the wavelength components in the first set, and wherein the second controllable means equalizes the wavelength components in the second set by controlling a zero order diffraction magnitude for each of the wavelength components in the second set and further suppresses the wavelength components in the first set by minimizing the zero order diffraction magnitude for each of the wavelength components in the first set.

* * * * *